Oct. 7, 1958 P. W. McCONNAUGHEY 2,855,280
COLORIMETRIC DETERMINATION
Filed June 15, 1956
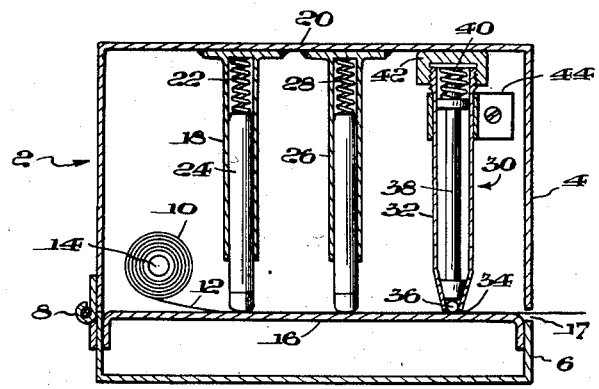
INVENTOR.
PAUL WILLIS McCONNAUGHEY.
BY
Brown, Critchlow, Flick & Peckham
his ATTORNEYS.

United States Patent Office 2,855,280
Patented Oct. 7, 1958

2,855,280

COLORIMETRIC DETERMINATION

Paul W. McConnaughey, Wilkinsburg, Pa., assignor to Mine Safety Appliances Company, Pittsburgh, Pa., a corporation of Pennsylvania Application June 15, 1956, Serial No. 591,669

6 Claims. (Cl. 23—232)

This invention relates to the determination of the presence of a specific constituent, such as hydrogen cyanide (HCN), in a medium which may be gaseous, liquid or solid.

Colorimetric indicators for use in determining the presence of a material, such as carbon monoxide or hydrogen cyanide, in a medium are known. These indicators in general are of the single use type, or if reusable, normally require recharging with new indicator after a single exposure. Multiple test units have been proposed wherein the indicator means is deposited on a test strip immediately prior to use. Such units have been characterized by difficulties such as lack of sensitivity, and the need to expose the indicator to the substance under test for an extended period of time to obtain positive results.

It is, therefore, an object of the present invention to provide a method for the preparation of a colorimetric indicator of adequate sensitivity as it is dispensed for use. It is a further object to provide a compact colorimetric device capable of use for a plurality of tests without recharging, which produces indicators which are of adequate sensitivity and are characterized by requiring short exposure periods to obtain an accurate indication of the constituent being detected.

In accordance with the present invention, a colorimetric device is provided which prepares an indicator on a suitable carrier strip as the carrier is being dispensed and additionally deposits on the strip, locally to the components of the indicator, a substance capable of conditioning, or activating, the components for reaction to obtain the most effective indicator in the shortest time. Thus a case is provided with a supply of indicator carrier therein. Also disposed within the case are means to deposit one or more components of the indicator on the carrier as it is withdrawn for use and means to dispense on the carrier in the locus of the indicator components a liquid capable of conditioning the indicator components for reaction between the indicator components and the constituent under test.

The particular liquid conditioning substance which will perform these functions to best advantage will depend primarily upon the constituent being detected, the physical state of the medium containing the constituent, the components of the indicator, and the nature of contact between the constituent and the indicator. In general, water is the preferred liquid vehicle. "Locus" is intended to indicate that the vehicle is deposited in a manner such that it will contact the indicator components; this normally is accomplished by continuously depositing the liquid in a line with the indicator components so that they will mix. It may also be done by joint deposition of a component and a liquid vehicle.

A typical application of the invention involves the colorimetric determination of the presence of hydrogen cyanide in air. In the present invention, means are provided whereby the components of a suitable indicator, such as a copper salt and an aromatic amine, are brought into contact with one another on a carrier paper as the paper is withdrawn for use. Thus, the paper may be impregnated with a suitable copper salt and the amine deposited on the carrier, as it is dispensed, as the active component of a crayon. Alternatively, the paper can be impregnated with the amine and the copper salt deposited from a crayon, or both components can be deposited from crayon-like forms. It is preferred to dispense all indicator components from crayon-type forms as this normally will be more economical than paper impregnation, and the device may be readily serviced for necessary refills and maintenance.

A difficulty normally encountered in the detection of HCN in air with indicators of the type specified herein has been the instability of such indicators. The preparation of the indicator immediately prior to use minimizes the problem of stability but is attended by the additional or new problems of mixing the components sufficiently to prepare the indicator, and obtaining adequate exposure of the indicator in order that HCN present can react and be detected within a reasonable time. These disadvantages are overcome in accordance with the present invention by deposition of water in a line with the components of the indicator as the carier paper is withdrawn. Thus as the paper is dispensed, the components are deposited and dispersed upon contact with the water so that reaction to form the indicator can take place substantially instantly. Moreover, the indicator is in a form with more reactive surface exposure throughout a given area upon its exit from the case due to the spreading action of the water so that maximum opportunity for contact with HCN is also provided.

The quantity of water, or other liquid reaction vehicle, need be only such as to insure prompt reaction coupled with adequate development of the charcteristic color. Where the primary function of the liquid is that of a solvent, such as for the extraction of the constituent being detected from a solid medium, the quantity of liquid must be sufficient to dissolve or disperse a detectable amount of the constituent. These features are highly contributive to accuracy and sped of any determination whether quantitative or qualitative.

The order of addition of the liquid vehicle can vary. For example, it can be deposited before any of the indicator components, after all of the inidcator components, or after one or some of the components and before one or more other components, or it can be deposited concurrently with a component, both in point of time and place. The liquid can be deposited after one or more components but before all of the components by arranging the means of deposition so that the liquid dispensing means is intermediate the means for depositing the components, or, where an impregnated paper is used, the liquid is deposited first or jointly with the first component to be deposited. The liquid may be deposited concurrently with an indicator component by employing the component as a solution or dispersion in the liquid. This latter method may be particularly advantageous where a component is itself unstable and must be kept as a solution or a dispersion in liquid, or where a desired component is a liquid at the conditions of use.

Typical aromatic amine components of a hydrogen cyanide indicator which may be used in the invention include ortho-toluidine, para-toluidine, para-phenetidine, 4,4′,4″ hexamethyltriaminotriphenylmethane, diphenyl benzidine and tetramethyldiaminodiphenylmethane. These components are compounded with a dispensing matrix, such as paraffin or other wax, or other material to bind the reagent in a form adapted for applying it to the carrier, and formed into a crayon for use in the invention if they are to be deposited on the carrier during withdrawal of the paper. The copper salts also can be formed into crayons and used as such. The concentration of the amine or of the copper salt in its matrix can vary, with each being present in an amount sufficient to provide an effective indicator upon contact with one another and the liquid vehicle on the carrier. The continuous matrix employed should not contain contaminants in deleterious quantities which may result in an unintended color change. The crayons are prepared according to conventional procedure and in a manner insuring homogeneity in the resulting product. Any of the methods for paper or cloth impregnation known in the art may be used for carrier impregnation for this invention.

The invention will be described further in conjunction with the appended drawing showing a vertical elevation of a preferred embodiment of apparatus of this invention.

Referring now to the drawing, the numeral 2 represents a case composed of an upper portion 4 and a lower portion 6. The two portions are connected by a means 8, which may be a spring hinge as shown, to retain the portions in contact with one another and permit ready access to the inside of the unit. A roll 10 of carrier paper 12 is disposed within the case 2 supported on an axle 14 and is freely withdrawable. A base 16 is provided, extending between the side walls of the case, which serves as a backing or supporting means for the carrier which is extended across the case. The paper can exit through a slot 17 at the wall of the case between the upper and lower portions 4 and 6. By cutting away a part of the wall of the lower portion, a finger hold can be provided by which the paper can be withdrawn.

Disposed within the case 2 are a plurality of means to facilitate deposition of the components of an indicator on the carrier paper. For the use of crayon type materials the means can comprise a cylinder 18 which may be joined to the upper horizontal member 20 of the case 2 as by welding. The cylinder 18 is provided with a spring 22 to exert a force on a crayon 24 disposed in the cylinder and act to continuously press the crayon against the carrier paper. A substantially identical cylinder 26 joined to roof member 20 and containing a spring 28 is provided to dispense a second component in crayon form. A third means 30 is provided in the case to dispense the liquid vehicle on the carrier. Means 30 preferably comprises a liquid retaining cylinder 32 with an open lower end 34. A ball 36 is disposed within the cylinder and is sized, with respect to the open end, to permit a portion of the ball to extend beyond the end of the cylinder. The ball is freely rotatable and is held in position by a rod 38 which does not interfere with the flow of liquid to the ball. A spring 40 exerts a force on the rod and is itself retained by a detachable cap member 42. A bracket 44 detachably connected to the case holds the liquid dispensing means in place.

In operation such as for the detection of HCN in air, the case is charged with paper, for example having a width of ¼ to ⅜ inch, which is extended along base 16 and through the slot 17. A crayon containing a copper salt, such as copper sulphate pentahydrate

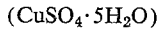

$(CuSO_4 \cdot 5H_2O)$ is placed in one of the cylinders while a crayon containing an aromatic amine, preferably tetramethyldiaminodiphenylmethane $(CH_2[C_6H_4N-(CH_3)_2]2)$, is placed in a second cylinder. A ball point dispenser 32 of the type described charged with water is placed in the case and the case closed, whereupon the ball point and the crayons contact and press against the paper. Force is then exerted on the end of the paper to withdraw it and as it moves the crayons mark the paper depositing their respective components while dispenser 32 deposits water. These three means are aligned and, therefore, the deposits of the crayons mix with one another and with the water. Sufficient of the paper is withdrawn to insure obtention of a representative indicator which is then exposed to the atmosphere under test. The indicator will develop a blue color or stain if HCN be present. By use of the same absolute quantities of indicator, prepared in a consistent manner and spread through the liquid vehicle in essentially the same manner, the resulting coloration, as a function of exposure time, will be related to the concentration of HCN in the locus under test. It will be observed that the apparatus disclosed provides for uniformity and speed in making determinations.

To demonstrate the effectiveness of the invention, a unit was prepared as described above. Copper sulfate pentahydrate in crayon form was made by mixing 75 parts by weight of the pentahydrate with 25 parts by weight of paraffin wax and forming the mixture into a cylindrical form of a diameter of about 3/16 inch. The amine component was prepared by mixing 75 parts by weight of tetramethyldiaminodiphenylmethane with 25 parts by weight of paraffin wax and forming into cylindrical form of a diameter of about 3/16 inch. A test was conducted with the water dispenser removed. Indicator strips were withdrawn and exposed to air containing HCN at a concentration of 50 micrograms per liter at 25° C. and 50 percent relative humidity. Through a five minute exposure period, no indication of the presence of the HCN was shown by the indicator. The water dispenser was then placed in the unit and strips according to the present invention were withdrawn and exposed to the air containing HCN in the concentration and at the conditions set forth above. A blue colored stain developed in the indicator during five seconds of exposure thereby dramatizing the improvement obtained.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A process for the preparation of a copper salt-aromatic amine indicator for HCN as it is dispensed which comprises separately depositing in non-aqueous form a copper salt and an aromatic amine on a carrier paper and into contact with one another while withdrawing the paper for use, and simultaneously depositing water on said paper in a line with the deposits of copper salt and amine whereby the water contacts said salt and amine.

2. A process according to claim 1 in which said copper salt is copper sulfate and said amine is tetramethyldiaminodiphenylmethane.

3. A process according to claim 2 in which said salt and said amine are present as the active components of solid crayons.

4. In a process of colorimetric detection in which an indicator is exposed to a material under test, the steps comprising separately depositing in non-aqueous form components of said indicator on a carrier as the carrier is withdrawn for use, simultaneously depositing a liquid on said carrier in a line with the deposits of indicator components but at a point remote from the point of deposition of at least one of said components of said indicator to activate said components for prompt reaction with the material being detected, and then exposing the resulting indicator carrier to the material under test.

5. Apparatus for preparing an indicator for colorimetric analysis of fluids, the apparatus comprising a case provided with a dispensing slot, an indicator strip in the case adapted to be dispensed through said slot, means in said case adapted to support said strip, a rod of solid indicator material in said case, means in said case to force an end of said rod of solid indictor material against the strip as it is moved out through said slot, and means in said case spaced lengthwise of the strip from said rod of solid indicator material adapted to apply a liquid to the strip in response to movement of the strip to mix with indicator material, whereby the strip removed from the case can be used as an indicator.

6. Apparatus in accordance with claim 5 in which said liquid-applying means includes a ball in contact with liquid and said strip, whereby movement of said strip rotates said ball and thereby applies liquid to said strip.

References Cited in the file of this patent

UNITED STATES PATENTS

| | | |
|---|---|---|
| 2,113,063 | Stryker et al. | Apr. 5, 1938 |
| 2,153,568 | Johnson | Apr. 11, 1939 |
| 2,748,024 | Klimkowski et al. | May 29, 1956 |